(12) United States Patent
Whalen et al.

(10) Patent No.: US 6,455,830 B1
(45) Date of Patent: Sep. 24, 2002

(54) SCANNING SENSOR SYSTEM WITH MULTIPLE ROTATING TELESCOPE SUBASSEMBLIES

(75) Inventors: Michael R. Whalen; Mitchell D. Gamble, both of Santa Barbara, CA (US)

(73) Assignee: Raytheon Company, Lexington, MA (US)

( * ) Notice: Subject to any disclaimer, the term of this patent is extended or adjusted under 35 U.S.C. 154(b) by 181 days.

(21) Appl. No.: 09/596,889

(22) Filed: Jun. 19, 2000

(51) Int. Cl.$^7$ .............................. H01J 3/14; G02B 23/02
(52) U.S. Cl. ..................... 250/203.1; 250/236; 359/429
(58) Field of Search ........................... 250/203.1, 203.2, 250/203.3, 203.4, 203.6, 234, 235, 236, 216, 334; 359/401, 429, 430, 365, 366; 356/446

(56) References Cited

U.S. PATENT DOCUMENTS

| | | | | |
|---|---|---|---|---|
| 5,338,933 A | * | 8/1994 | Reeves et al. | ............... 250/236 |
| 5,946,143 A | * | 8/1999 | Whalen | ...................... 359/728 |

* cited by examiner

Primary Examiner—Kevin Pyo
(74) Attorney, Agent, or Firm—William C. Schubert; Glenn H. Lenzen, Jr.

(57) ABSTRACT

A scanning sensor system includes a light sensor and a scanning telescope having a first telescope subassembly and a second telescope subassembly. Each of the telescope subassemblies has a primary telescope mirror oriented to receive an incident light beam over an angular viewing range as the primary telescope mirror is rotated about a primary-mirror rotation axis, and at least one additional telescope mirror positioned to receive a reflected light beam from the primary telescope mirror. A primary mirror drive rotates the primary telescope mirrors about the primary-mirror rotation axis at a primary mirror angular instantaneous rate of rotation. A half-angle derotation mirror has a derotation-mirror axis parallel to the primary-mirror rotation axis. The half-angle derotation mirror is positioned to reflect light in the optical path when each primary telescope mirror is within the angular viewing range and to direct the reflected image along the optical path toward the sensor. A derotation mirror drive rotates the derotation mirror about the derotation-mirror axis at a derotation angular rate of rotation that is one-half of the primary mirror angular instantaneous rate of rotation.

16 Claims, 3 Drawing Sheets

SCANNING SENSOR SYSTEM WITH MULTIPLE ROTATING TELESCOPE SUBASSEMBLIES

This invention was made with government support under Contract No. F04701-97-C-0028 awarded by the United States Air Force. The Government has certain rights in this invention.

This invention relates to a scanning sensor system and approach that are useful in remote sensing.

BACKGROUND OF THE INVENTION

A scanning sensor system gathers light energy in the ultraviolet, visible, and/or infrared ranges and directs the energy to a sensor. The sensor converts the light energy to electrical signals for subsequent analysis. In one design approach, the sensor remains relatively fixed in its spatial orientation. The light energy is directed to the sensor by a movable scanning mechanism, such as a rotating telescope, which is aimed in a direction of interest. Light energy received from that direction is redirected by the telescope's optical train, which has at least some movable elements, to the sensor. The optical train may also be designed to magnify or otherwise modify the image.

In one mission, a scanning sensor system is placed on board a platform (such as a spacecraft) that travels above the earth or other heavenly body. The scanning sensor system travels along a track above the surface of the body. The telescope scans laterally (i.e., cross track) so that the sensor system is able to sense a scene along a swath of the surface centered on the track of the platform.

Several designs have been developed for the scanning portion of such a scanning sensor system. A double-sided paddle wheel scan system has a double-sided flat mirror which is rotated about an axis perpendicular to the incident light. This paddle wheel system has the disadvantage that the beam footprint on the scanning mirror varies with scan angle, with the result that it may be difficult to package, it may have a high inertia, and it may require a high torque applied by the scan motor. It may also be difficult to baffle the paddle wheel system against stray light, and there are variations in polarization and overall system response with scan angle. Another design utilizes a single-sided, compound-angle head mirror which is rotated about an axis that may or may not be perpendicular to the incident beam. This configuration produces image rotation with respect to scan angle, which can lead to image registration problems. It may also have a substantial inactive scan period. Another scan approach is a single-sided rotating telescope that has the disadvantages of a long inactive scan period and difficulty in mounting and support.

There is a need for an improved scanning sensor system, and particularly one which has a relatively short inactive period and is readily implemented mechanically. The present invention fulfills this need, and further provides related advantages.

SUMMARY OF THE INVENTION

The present invention provides a scanning sensor system, which preferably includes a rotating telescope. A preferred embodiment of the system is well balanced and symmetrical as to the largest moving components. The primary telescope mirrors are placed relatively near to an axis of rotation, reducing the inertia of the scanning telescope assembly. Other benefits relative to available scanning telescopes include reduced polarization variations and response as a function of scan, absence of image rotation, inherent band-to-band registration, improved stray light rejection, limited scene footprint growth as a function of scan angle, and the potential for improved packaging.

In accordance with the invention, a scanning sensor system comprises a light sensor and a scanning telescope. The scanning telescope includes at least two primary telescope mirrors supported (preferably symmetrically) about a primary-mirror rotation axis. Each of the primary telescope mirrors is oriented to receive incident light along an incident ray path that is not parallel to the primary-mirror rotation axis. The scanning telescope includes at least one additional telescope mirror positioned to alternately receive a first reflected light beam from a first one of the primary telescope mirrors and thereafter a second reflected light beam from a second one of the primary telescope mirrors, and to direct the reflected light beam into the light sensor along an optical path. A primary mirror drive rotates the at least two primary mirrors about the primary mirror rotation axis at a primary mirror angular instantaneous rate of rotation. A half-angle derotation mirror is positioned to reflect a light beam in the optical path, and a derotation mirror drive rotates the derotation mirror about a derotation-mirror axis parallel to the primary mirror rotation axis at a derotation angular rate of rotation that is one-half of the primary mirror angular instantaneous rate of rotation during the active scan period. The primary telescope mirrors are preferably mounted in a housing.

In a preferred approach, there are exactly two primary telescope mirrors supported 180 degrees apart around the primary-mirror rotation axis, and the two primary mirrors face in diametrically opposed directions. The incident ray path is perpendicular to the primary-mirror rotation axis. There may be at least two additional telescope mirrors, one of which rotates with the primary telescope mirror and one of which is stationary. The scanning telescope may comprise an anastigmat mirror array. The derotation-mirror axis is preferably coincident with the primary-mirror rotation axis.

The presently most-preferred design has a pair of identical off-axis scanning telescopes, oriented back-to-back in a double-sided, rotating scan mechanism. As the double-sided scanning telescope assembly is rotated about the primary-mirror rotation axis, each scanning telescope alternately collects energy from various portions of the scene and directs it onto a single, rotating half-angle mirror. The half-angle mirror is rotated and moved independently of the rotation of the primary telescope mirrors. During active scan periods, the half-angle mirror is rotated at one-half the instantaneous angular rate of the primary mirrors, which allows the scene energy to be directed to a single-fixed location regardless of scan angle. This configuration requires that the reflecting surface of the half-angle mirror lie parallel to the primary-mirror rotation axis of the primary telescope mirrors. After reflection at the half-angle mirror, the beam is directed into the remaining portion of the optical imaging system and along the optical path to the sensor.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
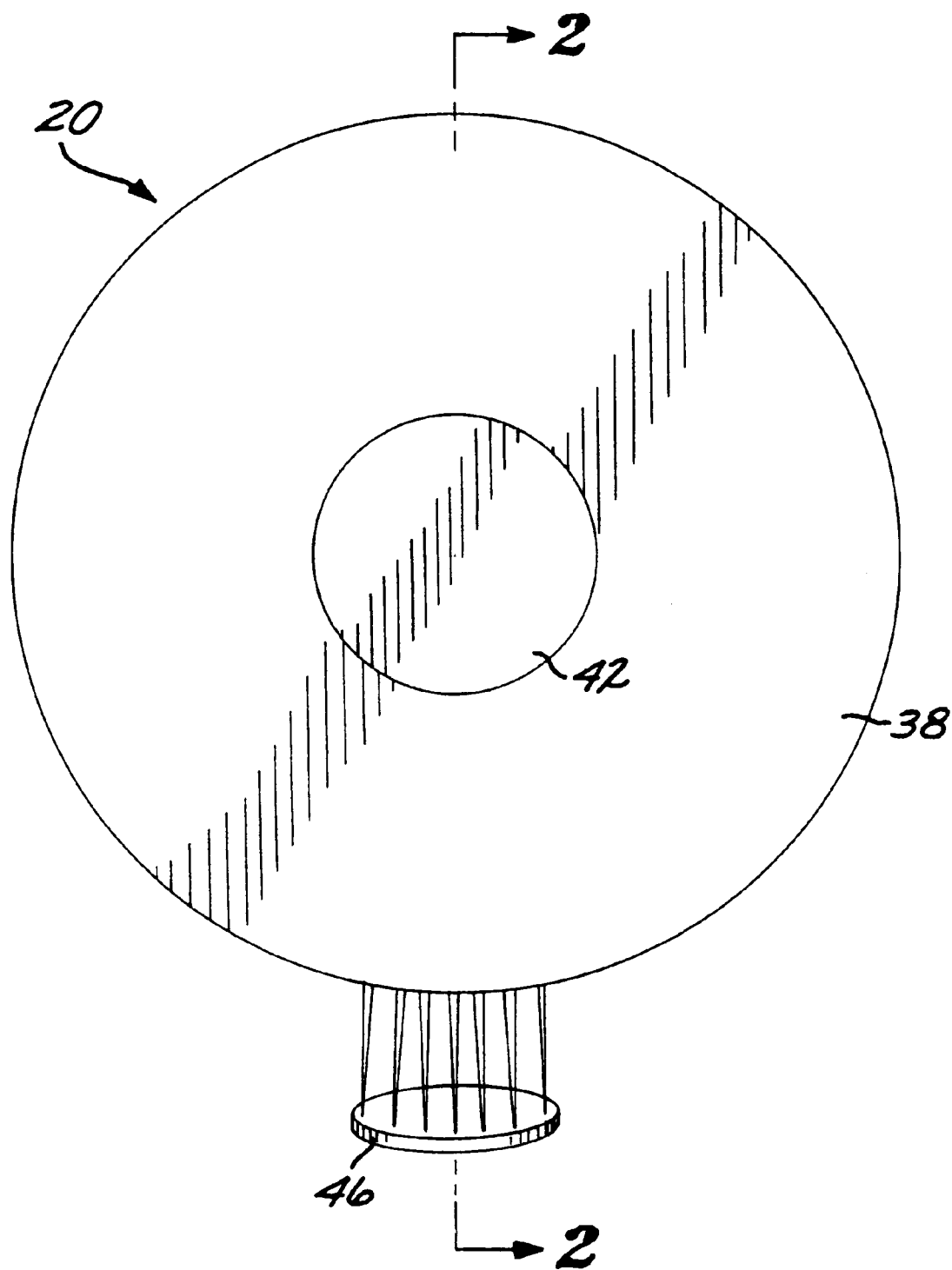
FIG. 1 is an end elevational view of a scanning sensor system.
Figure 2:
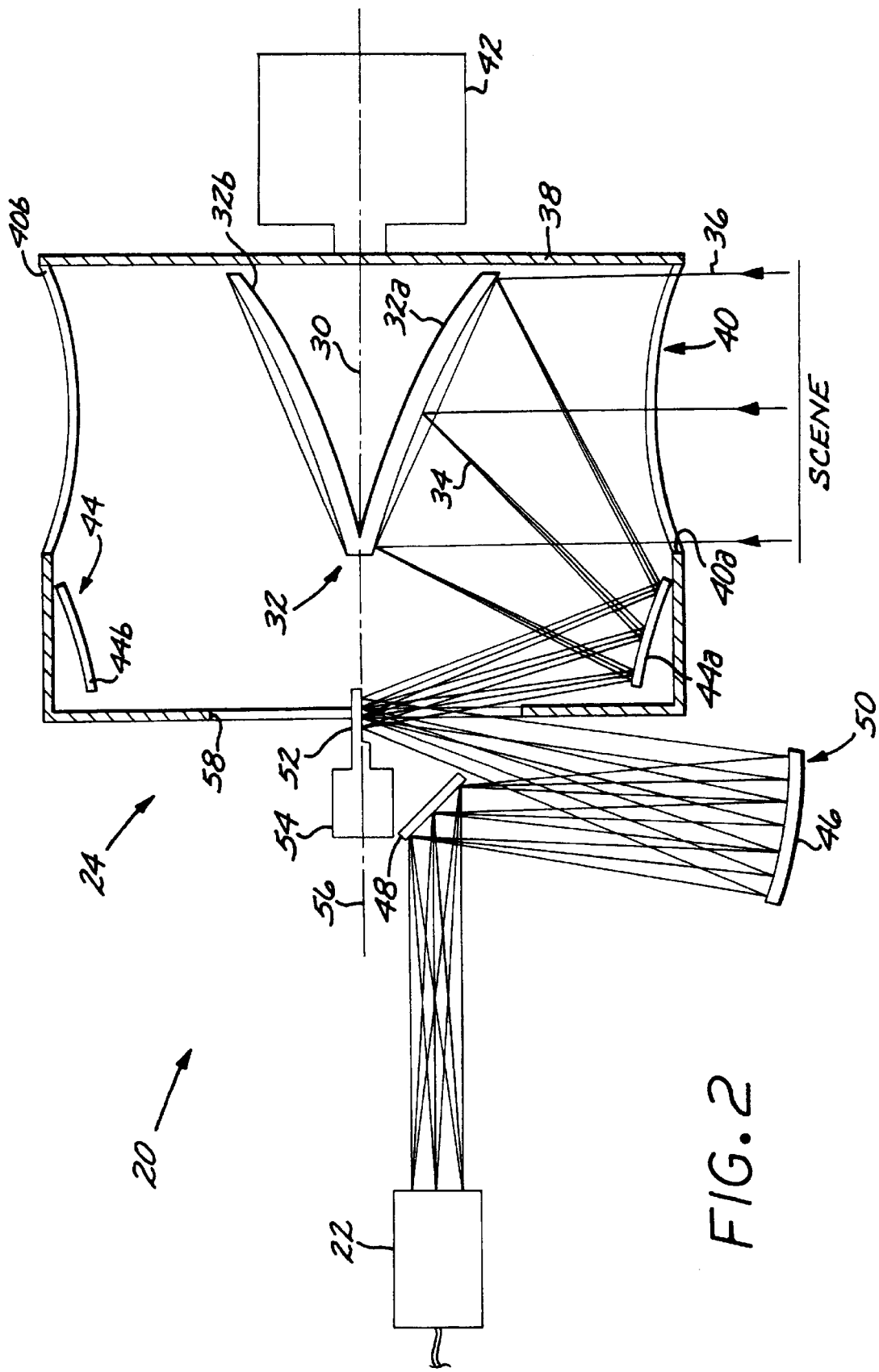
FIG. 2 is a schematic sectional view of the scanning sensor system of FIG. 1, taken along line 2—2, and the ray path through the scanning sensor system.

FIGS. 1 and 2 illustrate a preferred embodiment of a scanning sensor system 20 which includes a light sensor 22 and a scanning telescope 24. The sensor 22 converts incident light energy to an electrical signal and may be of the imaging type or the non-imaging type. Operable sensors 22 for ultraviolet, visible, and infrared light are known in the art.

Each scanning telescope 24 directs light from a scene into the sensor 22. There are at least two scanning telescopes 24, each of which includes a primary telescope mirror 32 symmetrically supported and rotated about a primary-mirror rotation axis 30. The rotational motion of the primary telescope mirrors may be continuous rotation, leading to a smooth movement and straightforward drive system, a variable-rate scan, a step-stare scan, or a combination of these and/or other movements. In the preferred case, there are exactly two telescopes 24 and two primary telescope mirrors 32a and 32b supported 180 degrees apart around the primary-mirror rotation axis 30. In this preferred embodiment, the two primary mirrors 32a and 32b face in diametrically opposed directions. The primary mirrors 32a and 32b come into an active angular viewing range and operate in an alternating fashion. In the illustrated case the primary mirror 32a is in an active scan period, and its optical ray path 34 is illustrated. At this time, the primary mirror 32b is in an inactive scan period, so that no optical rays are incident upon the primary mirror 32b. Upon rotation of 180 degrees, the primary mirror 32b becomes active and functions to view the scene (and the primary mirror 32a becomes inactive). Each of the at least two primary telescope mirrors is oriented to receive incident light along an incident ray path 36 that is not parallel to the primary-mirror rotation axis 30, and in the illustrated case is perpendicular to the primary-mirror rotation axis 30. This scanning sensor system is optically efficient, permitting two complete scene and calibration views per full rotation.

There may be additional primary mirrors 32, with all of the primary mirrors 32 arranged symmetrically about the primary-mirror rotation axis 30. There may not be fewer than two primary mirrors 32, however.

The two or more telescopes 24 may be substantially identical, so that the sensor 22 views the scene through identical optics for two active periods in each 360 degree rotation of the mirrors 32. The telescopes 24 may instead be different in respect to some selected optical characteristic. For example, the two primary mirrors 32a and 32b may have different fields of view (magnifications), so that the sensor 22 sees a wide-angle view during a first active portion of the scan and a narrow-angle, magnified view during a second active portion of the scan. In another example, the two primary mirrors 32a and 32b may be optimized for different wavelengths of the light energy in the incident ray path 36 arriving from the scene.

The primary mirrors 32a and 32b are mounted within a housing 38 having respective openings 40, here openings 40a and 40b, therethrough to allow entry of light traveling along the incident ray path 36. A primary mirror drive 42 is operable to continuously rotate the at least two primary mirrors 32a and 32b about the primary-mirror rotation axis 30 at a primary mirror angular instantaneous rate of rotation. (The term "instantaneous" refers to the rotational rate at any moment in time during an active scan period, inasmuch as the rotational rate may change.) In the illustrated embodiment, the primary mirror drive 42 is an electric motor that is attached to the housing 38 and rotates the housing 38, with its primary mirrors 32 and other structure mounted therein, about the axis of rotation 30.

The primary mirrors 32 reflect the ray path 34 to respective secondary mirrors 44, which may be powered mirrors or unpowered mirrors. The secondary mirrors 44 are mounted within the housing 38 and rotate with it. There is one secondary mirror 44 for each of the primary mirrors 32. In the illustrated case, there is a secondary mirror 44a that receives the reflected light ray path 34 from the primary mirror 32a when it is in its active scan period, and a secondary mirror 44b that receives its reflected light ray path from the primary mirror 32b when it is in its active scan period.

The scanning telescope 24 further includes an additional telescope mirror, in this case a tertiary mirror 46, which is positioned to alternatingly receive a first reflected light beam along the ray path 34 reflected from a first one of the primary telescope mirrors 32, in the illustrated case the first primary mirror 32a, and thereafter a second reflected light beam (not shown) reflected from a second one of the primary telescope mirrors 32, in the illustrated case the second primary mirror 32b. In the preferred case, the primary mirror 32, the secondary mirror 44, and the tertiary mirror 46 are arranged and curved to form an anastigmat mirror array 50. That is, the primary mirror 32a, the secondary mirror 44a, and the single tertiary mirror 46 form one anastigmat mirror array when the primary mirror 32a is active and is reflecting the light beam along the optical ray path 34. The primary mirror 32b, the secondary mirror 44b, and the single tertiary mirror 46 form a second anastigmat mirror array when the primary mirror 32b is active and is reflecting the light beam along the optical ray path 34.

There is only one tertiary mirror 46 illustrated, but there may be additional mirrors, such as a fold mirror 48, which together in combination with the other mirrors of the telescope 24 direct the reflected light beam into the light sensor 22 along the optical ray path 34. The light sensor may be positioned to receive the light beam along the optical path 34 parallel to the primary-mirror rotation axis 30 at that point, or at any other selected position.

The scanning telescope 24 further includes a half-angle derotation mirror 52 positioned to reflect the light beam at a location in the optical ray path 34 between the primary mirror 32 and the tertiary mirror 46. The derotation mirror 52 is a flat mirror that may be reflective on one side only, or reflective on both sides. A derotation mirror drive 54 is operable to rotate the derotation mirror 52 about a derotation-mirror axis 56. The derotation mirror axis 56 is preferably parallel to the primary-mirror rotation axis 30 of the primary mirrors 32. Most preferably, and as shown, the derotation mirror axis 56 is coincident with the primary-mirror rotation axis 30.

Where the derotation-mirror axis 56 is not parallel to the primary-mirror rotation axis 30, the image received at the sensor 22 rotates as the primary mirror 32 turns. This condition is not preferred for most imaging applications, but may be acceptable in others and is within the scope of the invention. If the derotation-mirror axis 56 is parallel to, but not coincident with, the primary-mirror rotation axis 30, the image received at the sensor 22 does not rotate. If the derotation-mirror axis 56 is coincident with the primary-mirror rotation axis 30 (a special case of parallel axes 56 and 30), the image received at the sensor 22 does not rotate and the system may be somewhat better balanced than in the parallel-but-not-coincident case. The latter configuration is most preferred.

The derotation mirror drive 54 is preferably an electric motor. In FIG. 2, the derotation mirror drive 54 is pictured as a different motor than the primary mirror drive 42, but the same motor with appropriate gearing may be used to drive both the primary mirrors 32 and the derotation mirror 52. In either case, the derotation mirror drive 54 is selected to rotate the derotation mirror 52 at an angular rate of exactly one-half the instantaneous rotation rate of the primary mirrors 32 produced by the primary mirror drive 42, during active scanning periods. (During inactive scan periods, a faster drive rate may be utilized for the derotation mirror 52 when it is being reset to its initial position for the next active scan period.) The light beam traveling along the optical ray path 34 reaches the derotation mirror 52 through an opening 58 in the base of the housing 38.

In operation of the scanning telescope 24, the primary mirror 32 is scanned across the scene by the rotation of the primary mirror 32 about the primary-mirror rotation axis 30. The half-angle rotation of the derotation mirror 52 in the optical ray path 34 derotates (negates) the rotation of the optical ray path 34 produced by the rotation of the primary mirror 32 about the primary-mirror rotation axis 30. The tertiary mirror 46, the fold mirror 48, and the sensor 22 may therefore remain stationary with respect to rotation about the primary-mirror rotation axis 30, a significant advantage that reduces the rotating mass and inertia of the rotating portion of the scanning sensor system 20. In a first active scan portion of the rotation of the primary mirror 32 about the primary-mirror rotation axis 30, the derotation mirror 52 rotates from an initial position in the same direction as the rotation of the primary mirror 32a, but at half the instantaneous rotational rate. During a first inactive period when no primary mirror 32 is positioned to view the scene, the derotation mirror 52 is rotated to reset it to the initial position. This rotation to the initial position is readily accomplished because of the small size and light weight of the derotation mirror 52. The derotation mirror 52 thereafter rotates in the same rotational direction as the primary mirror 32b, but at half its instantaneous rotational rate, during a second active scan period.

FIGS. 1 and 2 illustrate one form of the scanning telescope 24. Other types of off-axis scanning telescope designs may be used as well and are within the scope of the invention. For example, the scanning telescope may use a two-mirror telescope, with the half-angle derotation mirror inserted in its output beam. The half-angle derotation mirror may instead be inserted in the optical path between the primary mirror and the secondary mirror of a three-mirror telescope. The scanning telescope may include additional mirrors. The approach of FIGS. 1 and 2 is preferred, as the rotating portion of the scanning telescope 24 is symmetrical and balanced, so that it does not tend to cause the scanning telescope to wobble in its rotation.

Figure 3A:
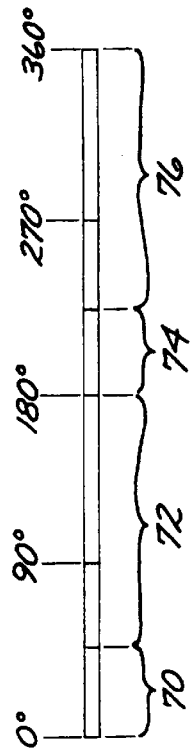
FIGS. 3A–3B present a comparison of the active scan field for the approach of the invention (FIG. 3A) and for a double-sided paddle wheel scan system (FIG. 3B) for an exemplary 90 degree scene case.
Figure 3B:
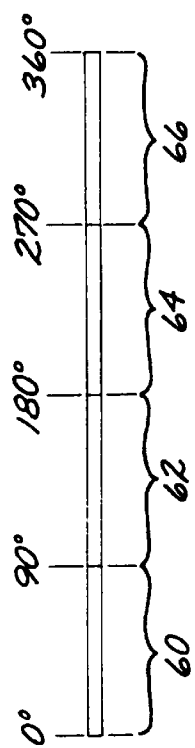

FIGS. 3A and 3B illustrate the scanning efficiency advantages of the present approach over that of a double-sided paddle wheel scanning sensor system, for an example of a 90-degree scene view. The present rotational telescope scanning approach covers 1 degree of scene view for each 1 degree of angular rotation. According to the present approach as shown in FIG. 3A, a first active scan period 60 occurs from 0 to 90 degrees of rotation, a first inactive period 62 occurs from 90 to 180 degrees of rotation, a second active scan period 64 occurs from 180 to 270 degrees of rotation, and a second inactive period 66 occurs from 270 to 360 degrees of rotation. That is, active scanning is permitted during one-half of the total rotational period of 360 degrees. By comparison, in the double-sided paddle wheel scanning sensor system, the law of reflection dictates that 2 degrees of scene view is covered for every 1 degree of angular rotation. The resulting scan periods are shown in FIG. 3B, where a first active scan period 70 occurs from 0 to 45 degrees of rotation, a first inactive period 72 occurs from 45 to 180 degrees of rotation, a second active scan period 74 occurs from 180 to 225 degrees of rotation, and a second inactive period 76 occurs from 225 to 360 degrees of rotation. That is, active scanning is permitted during only one-fourth of the total rotational period. The present approach achieves twice as much active scanning dwell time of the scene as the double-sided paddle wheel approach, for any selected rotational rate. The increased scanning dwell time of the present approach also translates directly into increased light-gathering capability of the present approach, and accordingly a higher signal-to-noise ratio.

Figure 4:
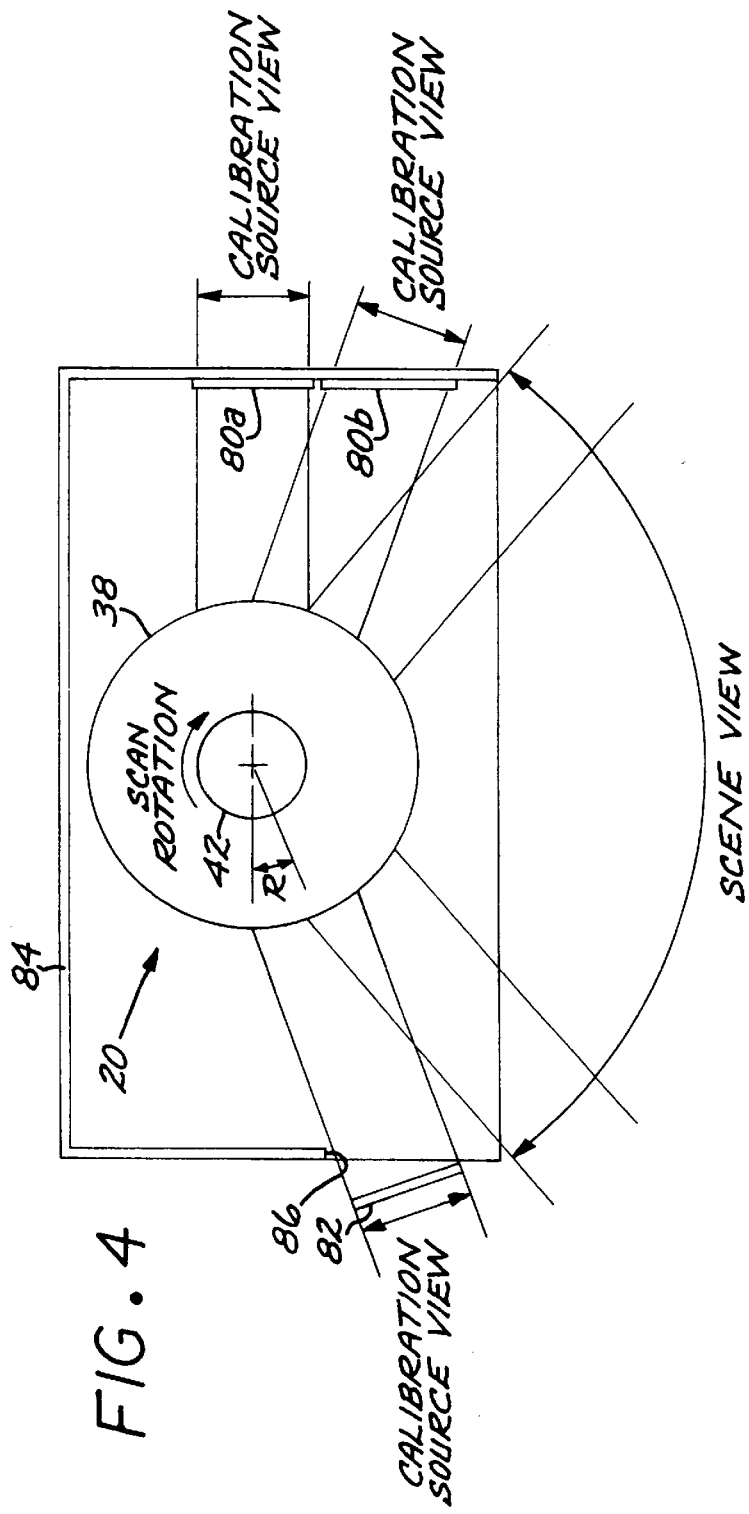
FIG. 4 is a schematic end elevational view of the scanning sensor system, as in FIG. 1, with a housing and with an indication of calibration-viewing and scene-viewing fields.

FIG. 4 illustrates an example of one possible approach of the present invention to calibration of the sensor 22. This example illustrates the advantages of the present invention, but other calibration techniques and arrangements are possible and are within the scope of the invention. In the illustrated approach of FIG. 4, each of the two primary telescope mirrors 32 may be considered over a 180 degree arc. In most scanning sensor systems 20, it is desirable to provide for the ability to calibrate the sensor 22 using on-board calibration sources 80a and 80b and also external calibration sources 82. The on-board calibration sources 80a and 80b are mounted to the body 84 of the spacecraft or other structure that supports the scanning sensor system 20, while the external sources 82 are viewed through a window 86. As the primary mirror is scanned clockwise in FIG. 4, it first views the calibration source 80a and then the calibration source 80b. The scene is viewed over the angle indicated as "scene view". The primary mirror then views the external source 82. The primary mirror 32 is thus engaged in calibration or scene viewing for most of the indicated 180 degree arc. During the remainder of the 180 degree viewing range, indicated by the angle R, the primary mirror 32 is inactive in that it views neither a calibration source nor the scene, so that the derotation mirror 52 may be reset back to its initial position. The other primary mirror follows the same pattern as it is rotated to the active viewing range. Thus, the sensor 22 is nearly always receiving a signal—either a calibration signal or a scene signal—except for the two short arcs R when the derotation mirror is being reset at the end of each 180 degree viewing range.

Although a particular embodiment of the invention has been described in detail for purposes of illustration, various modifications and enhancements may be made without departing from the spirit and scope of the invention.

Accordingly, the invention is not to be limited except as by the appended claims.

What is claimed is:

1. A scanning sensor system, comprising:
   a light sensor;
   a scanning telescope, comprising at least two primary telescope mirrors supported about a primary-mirror rotation axis, each of the at least two primary telescope mirrors being oriented to receive incident light along an incident ray path that is not parallel to the primary-mirror rotation-axis and to direct the incident light along an optical path, and at least one additional telescope mirror positioned to alternately receive a first reflected light beam from a first one of the primary telescope mirrors and thereafter a second reflected light beam from a second one of the primary telescope mirrors, and to direct the reflected light beam along the optical path;

a primary mirror drive operable to rotate the at least two primary mirrors about the primary-mirror rotation axis at a primary mirror angular instantaneous rate of rotation;

a half-angle derotation mirror positioned to further reflect the reflected light beam in the optical path, the combination of the scanning telescope and the derotation mirror directing the light beam along the optical path toward the sensor; and a derotation mirror drive operable to rotate the derotation mirror about a derotation-mirror axis parallel to the primary-mirror rotation axis at a derotation angular rate of rotation that is one-half of the primary mirror angular instantaneous rate of rotation.

2. The scanning sensor system of claim 1, wherein the primary telescope mirrors are symmetrically supported about the primary-mirror rotation axis.

3. The scanning sensor system of claim 1, wherein there are exactly two primary telescope mirrors supported 180 degrees apart around the primary-mirror rotation axis, and the two primary mirrors face in diametrically opposed directions.

4. The scanning sensor system of claim 1, further including
a housing in which the at least two primary telescope mirrors are mounted.

5. The scanning sensor system of claim 1, wherein the derotation-mirror axis is parallel to the primary-mirror rotation axis.

6. The scanning sensor system of claim 1, wherein the scanning telescope comprises an anastigmat mirror array.

7. The scanning sensor system of claim 1, wherein there are at least two additional telescope mirrors, and wherein at least one of the two additional telescope mirrors rotates with the primary telescope mirror.

8. The scanning sensor system of claim 1, wherein there are at least two additional telescope mirrors, and wherein at least one of the two additional telescope mirrors is stationary.

9. The scanning sensor system of claim 1, wherein the incident ray path is perpendicular to the primary-mirror rotation axis.

10. A scanning sensor system, comprising:
a light sensor;
a scanning telescope, comprising
a first telescope subassembly including
a first primary telescope mirror oriented to receive an incident light beam over an angular viewing range as the first primary telescope mirror is rotated about a primary-mirror rotation axis, the incident light beam being perpendicular to the primary-mirror rotation axis, and to redirect the incident light beam along an optical path, and
at least one first telescope subassembly additional telescope mirror positioned to receive a first reflected light beam from the first primary telescope mirror and to direct the first reflected light beam along the optical path when the first primary telescope mirror is within the angular viewing range,
a second telescope subassembly including
a second primary telescope mirror oriented to receive the incident light beam over the angular viewing range as the second primary telescope mirror is rotated about the primary-mirror rotation axis and to redirect the incident light beam along the optical path, the second primary telescope mirror being symmetrically supported 180 degrees apart from the first primary telescope mirror around the primary-mirror rotation axis such that the two primary telescope mirrors face in diametrically opposed directions, and
at least one second telescope subassembly additional telescope mirror positioned to receive a second reflected light beam from the second primary telescope mirror and to direct the second reflected light beam along the optical path when the second primary telescope mirror is within the angular viewing range,
a primary mirror drive operable to rotate the first primary telescope mirror and the second primary telescope mirror about the primary-mirror rotation axis at a primary mirror angular instantaneous rate of rotation;
a half-angle derotation mirror having a derotation-mirror axis lying parallel to the primary-mirror rotation axis and positioned to reflect light in the optical path, the combination of the scanning telescope and the derotation mirror directing the light beam along the optical path toward the sensor; and
a derotation mirror drive operable to rotate the derotation mirror about the derotation-mirror axis at a derotation angular rate of rotation that is one-half of the primary mirror angular instantaneous rate of rotation.

11. The scanning sensor system of claim 10, further including
a housing in which the first primary telescope mirror and the second primary telescope mirror are mounted.

12. The scanning sensor system of claim 10, wherein the optical path is parallel to the primary-mirror rotation axis at a location at which it is received by the light sensor.

13. The scanning sensor system of claim 10, wherein the first telescope subassembly and the second telescope subassembly each comprises an anastigmat mirror array.

14. A scanning sensor system, comprising:
a light sensor;
a scanning telescope, comprising
a first telescope subassembly including
a first primary telescope mirror oriented to receive an incident light beam over an angular viewing range as the first primary telescope mirror is rotated about a primary-mirror rotation axis, the incident light beam being perpendicular to the primary-mirror rotation axis,
a first secondary telescope mirror which rotates with the first primary telescope mirror and receives a reflected light beam from the first primary telescope mirror when the first primary telescope mirror is within the angular viewing range, and
a stationary telescope mirror which receives the first reflected light beam from the first secondary telescope mirror when the first primary telescope mirror is within the angular viewing range, a second telescope subassembly including
   a second primary telescope mirror oriented to receive the incident light beam over the angular viewing range as the second primary telescope mirror is rotated about the primary-mirror rotation axis, the second primary telescope mirror being symmetrically supported 180 degrees apart from the first primary telescope mirror around the primary-mirror rotation axis such that the two primary telescope mirrors face in diametrically opposed directions, and
   a second secondary telescope mirror which rotates with the second primary telescope mirror and receives the reflected light beam from the second primary telescope mirror when the second primary telescope mirror is within the angular viewing range, the second secondary telescope mirror reflecting the light beam to the stationary mirror;
a primary mirror drive operable to rotate the first primary telescope mirror, the first secondary telescope mirror, the second primary telescope mirror, and the second secondary telescope mirror about the primary-mirror rotation axis at a primary mirror angular instantaneous rate of rotation;
a half-angle derotation mirror having a derotation-mirror axis lying parallel to the primary-mirror rotation axis and positioned to reflect the reflected light beam when the first primary telescope mirror is within the angular viewing range and when the second primary telescope mirror is within the angular viewing range, the combination of the scanning telescope and the derotation mirror directing the light beam along the optical path toward the sensor; and
a derotation mirror drive operable to rotate the derotation mirror about the derotation-mirror axis at a derotation angular rate of rotation that is one-half of the primary mirror angular instantaneous rate of rotation.

15. The scanning sensor system of claim 14, further including
a housing in which the first primary telescope mirror and the second primary telescope mirror are mounted.

16. The scanning sensor system of claim 14, wherein the first telescope subassembly and the second telescope subassembly each comprises an anastigmat mirror array.

* * * * *